Dec. 15, 1959  O. K. KELLEY  2,917,137
FLUID COOLING SYSTEM FOR LIQUID COOLED FRICTION BRAKES
Filed June 17, 1955  3 Sheets-Sheet 2

INVENTOR.
Oliver K. Kelley
BY Craig V. Morton
HIS ATTORNEY

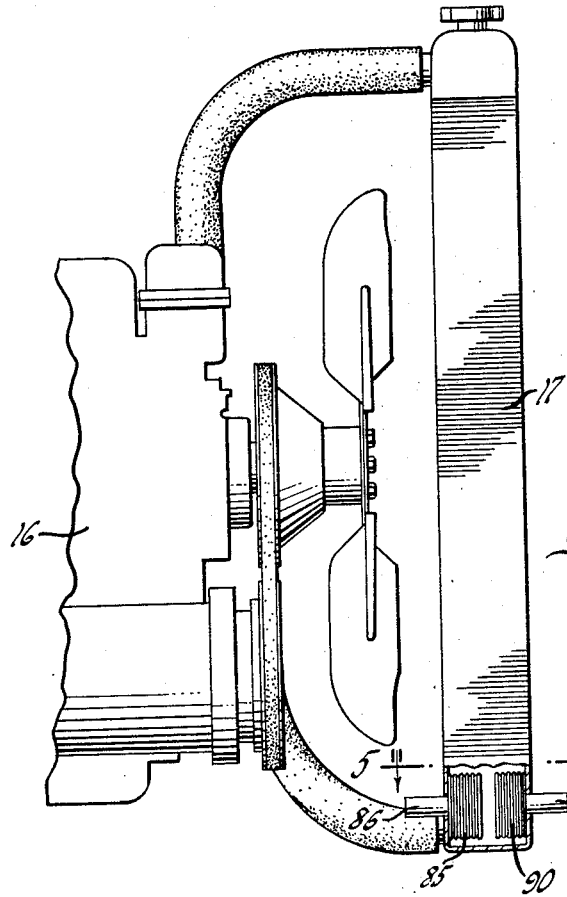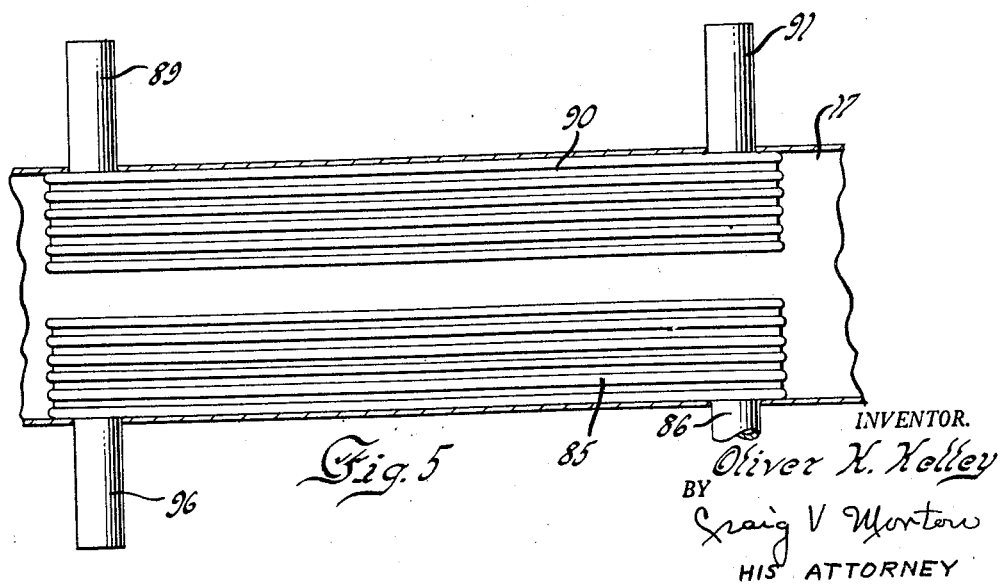

United States Patent Office 2,917,137
Patented Dec. 15, 1959

2,917,137

FLUID COOLING SYSTEM FOR LIQUID COOLED FRICTION BRAKES

Oliver K. Kelley, Bloomfield Hills, Mich., assignor to General Motors Corporation, Detroit, Mich., a corporation of Delaware Application June 17, 1955, Serial No. 516,294

7 Claims. (Cl. 188—264)

This invention relates to a cooling system for circulating the cooling fluid through friction brakes to remove the heat of friction.

One of the problems concerning the use of liquids in cooling systems for use on motor vehicles that operate under wide temperature conditions concerns the change in viscosity in liquids that are used in the cooling system. It is well known that when the temperature of liquids drops considerably, that the viscosity of the liquid substantially increases. Since automotive vehicles operate at temperatures from conditions of desert heat to frigid arctic conditions, the viscosity of the liquid used in a cooling system will vary over a wide range.

As the viscosity of the liquid increases the friction loss created as a result of transfer of the liquid through a circulating system by means of a pump operated by the engine of a vehicle will result in a less efficient operation of the vehicle engine since the more viscous cooling liquid circulated through the brakes for cooling results in a greater friction drag between the rotating and stationary plates even when the brake is in a retracted condition.

As a result, it is desirable that under low temperature conditions, the temperature of the cooling fluid be brought to an optimum operating temperature as rapidly as possible to eliminate the friction drag created by the viscous liquid as quickly as possible after the motor vehicle has started its operation.

It is therefore an object of this invention to provide a liquid circulating system for circulating a cooling fluid through friction brakes of a vehicle in which the circulating fluid is maintained in a minimum circulation system through the brakes of a vehicle until such time as the temperature of the cooling fluid reaches a predetermined minimum optimum temperature.

It is another object of the invention to provide a fluid circulating cooling system for friction brakes of a vehicle wherein a pump is provided for circulating the cooling fluid through the wheels of the vehicle with the pump being operably connected with a thermally actuated valve by which the cooling fluid is circulated from the inlet to the outlet of the pump without passage through any heat exchange medium for cooling of the liquid until after the cooling liquid has reached a minimum optimum operating temperature.

It is another object of the invention to provide a fluid circulating system for cooling friction brakes in accordance with the foregoing object wherein the thermal control will be effective to cause the circulating cooling fluid to by-pass the heat exchangers provided for cooling the fluid at any time the circulating fluid falls below the predetermined minimum optimum temperature.

Another object of the invention is to provide a fluid circulating system for circulating cooling fluid through the friction brakes of a vehicle wherein heated fluid from one set of brakes for the vehicle is delivered through a heat exchanger to cool the liquid before passing the liquid to a second set of brakes for the vehicle, the heated fluid from the second set of brakes passing through a second heat exchanger to cool the circulating liquid before returning the cooled liquid to a reservoir or the first set of brakes.

Still another object of the invention is to provide a liquid circulating system for cooling the friction brakes of a vehicle in accordance with the foregoing objects wherein the cooling fluid is utilized in the hydraulic brake actuating system for the brakes, the reservoir for the circulating cooling fluid being common to the hydraulic brake actuating system for supply of hydraulic fluid to the hydraulic brake actuating system so long as any cooling fluid remains in the cooling circulating system to thereby insure brake actuation even though the cooling fluid may be running low in the circulating system for the friction brakes.

Still another object of the invention is to provide a system for circulating cooling fluid through the brakes of the vehicle wherein fluid pumps are provided in one pair of brakes for the vehicle, the pumps being interconnected through a thermally operated valve in a manner that the cooling fluid will be circulated only between the pumps and the brake common to the wheel supporting the pump so long as the thermally responsive valve remains in an open position, the valve being constructed and arranged in a manner that when it is closed in response to a predetermined temperature rise of the liquid circulating between the pump and the brake, the fluid will then be delivered through heat exchanger means to remove the excess heat from the cooling fluid, and also will be circulated to other brakes on the vehicle for cooling them after the fluid has passed through the heat exchange means.

Still another object of the invention is to provide a fluid circulating system for cooling the friction brakes of a vehicle in accordance with any of the foregoing objects wherein the heat exchange means for cooling the fluid to remove heat of friction absorbed in the fluid is located in the bottom portion of the radiator for the engine of the vehicle whereby to insure full cooling of the brake cooling fluid so long as any water remains in the engine radiator.

Further objects and advantages of the present invention will be apparent from the following description, reference being had to the accompanying drawings wherein a preferred form of the invention is clearly shown.

In the drawings:

Figure 4 is an elevational view, partially in cross section illustrating the placement of heat exchange means in the bottom portion of a radiator for cooling the circulating water for a vehicle engine.

Figure 5 is a cross sectional view taken along line 5—5 of Figure 4.

Figure 1:
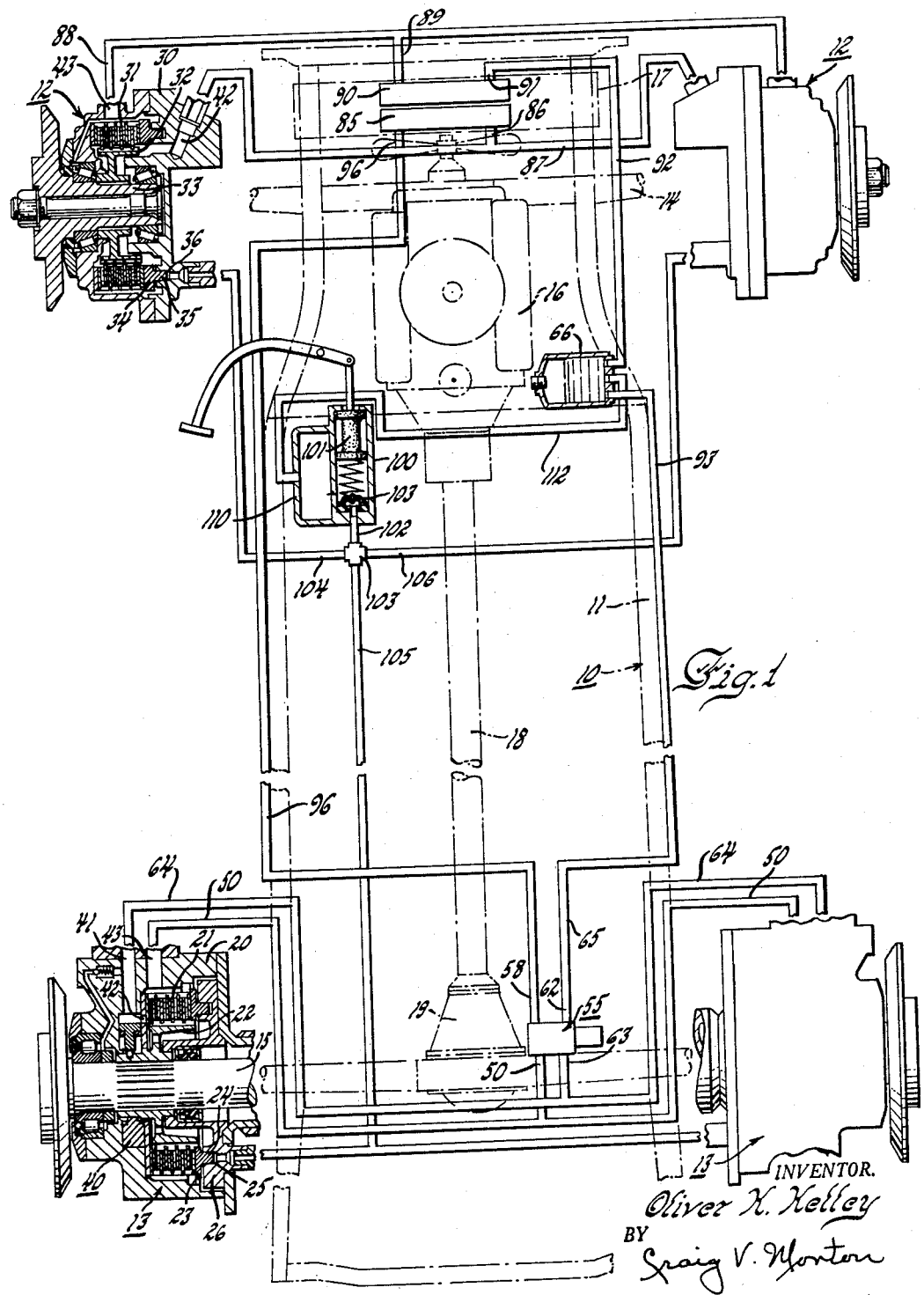
Figure 1 is a schematic view illustrating a fluid circulating system for the friction brakes of a vehicle incorporating features of this invention.

In Figure 1 there is illustrated schematically a vehicle 10 on which the brake system of this invention is applied. The vehicle 10 comprises a conventional frame 11 on which there is supported front wheel brakes 12 and rear wheel brakes 13. The front wheel brakes are supported on the usual suspension system carried on a cross frame member 14. The rear wheel brakes 13 are carried on the rear axle 15.

The frame 11 also supports a vehicle engine 16 operably connected with a radiator 17 through which water is circulated for cooling the engine. The engine 16 is connected to the rear axle through a conventional drive shaft 18 and differential 19.

The rear wheel brakes 13 each comprise a housing 20 containing a multiple disk assembly 21 providing the friction brake. Some of the disks of the assembly 21 are carried by the stationary housing 20 while other of the disks are supported upon the rotating hub 22 that is supported upon the rear axle 15. The brake disks of the disk assembly 21 are brought into friction engagement for a braking operation by means of actuation of a pressure plate 23 having an annular projection 24 that operates in an annular groove 25 provided in the housing member 26 whereby to provide a wheel cylinder to receive hydraulic brake actuating fluid.

The front wheel brake 12 consists of a housing 30 that encloses a multiple disk assembly 31 forming the friction brake. Some of the disks of the assembly 31 are carried by the stationary housing 30 while other of the disks are carried by the rotating hub 32 that in turn is supported on the rotating axle spindle 33. A pressure plate 34 is provided at one side of the disk assembly 31 and has an annular projection 35 positioned in an annular groove 36 that forms a wheel cylinder for receiving hydraulic fluid under pressure from a hydraulic actuating system for operation of the brake.

The rear brake 13 includes a vane type pump 40 that is keyed to the hub 22 so as to effect circulation of fluid by the pump when the wheel axle 15 is rotated. The pump 40 receives fluid through the inlet 41 and delivers fluid under pressure through an outlet passage 42 into the brake chamber that contains the disk assembly 21. Fluid under pressure is circulated between the disks 21 and is discharged from the housing through the passage 43.

Similarly, fluid under pressure is delivered into the front wheel brake 12 through a passage 42 for circulation between the disks 31 and is discharged from the brake 12 through a passage 43.

It will thus be seen that both the front and rear wheel brakes 12 and 13 are constructed and arranged to receive fluid under pressure for circulation through the brake to remove the heat of friction caused by braking engagement of the disk assemblies 21 and 31, the rear wheel brake 13 being provided with a pump to effect the desired circulation of fluid through both the front and rear brakes through a circulating system hereinafter described.

The particular structure of the front and rear wheel brakes 12 and 13 is more fully disclosed and described in the copending application of Kelley, Hause and Heck, Serial No. 516,282, filed June 17, 1955.

The fluid circulating system for the circulation of cooling fluid through the front and rear wheel brakes includes a fluid discharge line 50 that receives fluid under pressure from the pumps 40 of the rear wheel brake assemblies as exhausted from the brakes through the port 43. Since both rear wheel brakes are identical in structure, only one is described and referred to.

The fluid under pressure in the discharge line 50 is delivered to a control valve 55 that is thermally actuated in response to the temperature of the fluid delivered from the line 50 into the valve 55.

Figure 2:
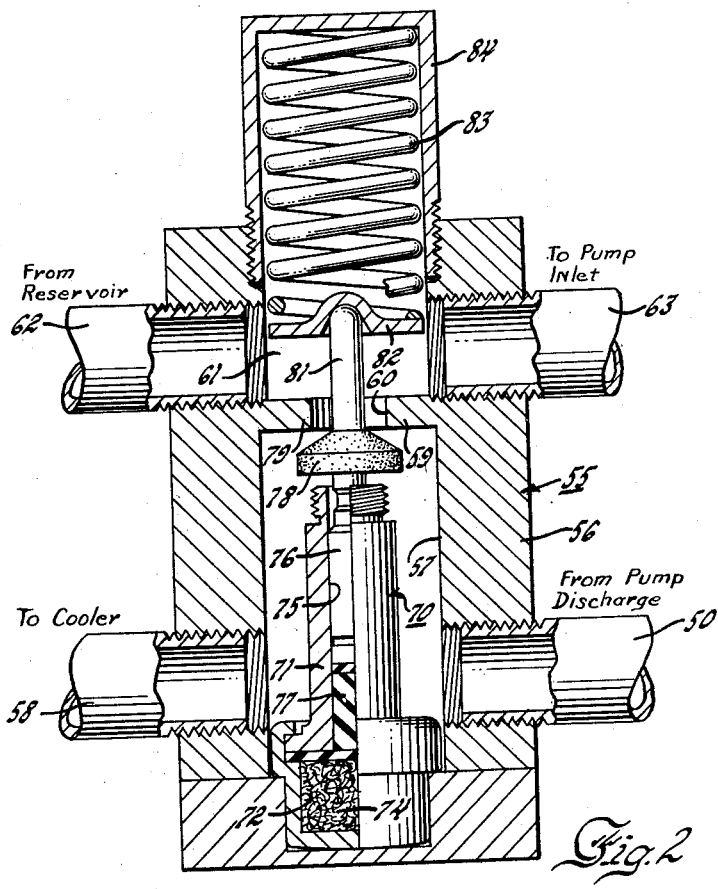
Figure 2 is a cross sectional view of a thermally responsive valve for controlling the circulation of cooling fluid in the system shown in Figure 1.
Figure 3:
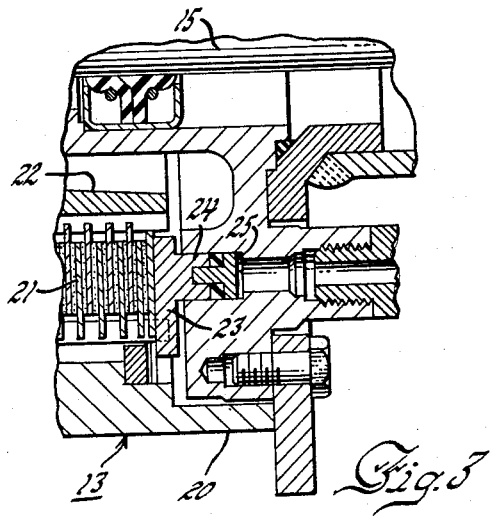
Figure 3 is an enlarged cross sectional view of a portion of a multiple disk friction brake adapted for use in the cooling system of Figure 1.

The control valve 55 is more particularly disclosed in Figure 2. The valve includes a body 56 having an internal chamber 57. The line 50 delivers fluid under pressure into the chamber 57 at one side thereof. A second line 58 provides for exhaust of fluid under pressure from the chamber 57.

The chamber 57 has a transverse wall 59 provided with a port 60 by which the chamber 57 communicates with a chamber 61. The chamber 61 has two line connections 62 and 63, the line connection 63 being connected with the circulating line 64 that connects with the inlet 41 of the pump 40. The other line connection 62 is connected by means of a line 65 with a fluid reservoir 66 in a manner and for a reason more fully described hereinafter.

The valve 55 includes a thermally responsive device 70 that includes a body 71 having a cavity 72 filled with a thermally responsive substance 74 that expands upon being heated. The body 71 has a bore 75 that receives a plunger 76 reciprocable therein. Between the plunger 76 and the thermally responsive substance 74 there is provided a resilient rubberlike plug 77 that is caused to move forwardly in the bore 75 upon expansion of the thermally responsive substance 74.

The forward end of the plunger 76 carries a valve head 78 that is adapted to set upon the edge 79 of the port 60 whereby to close the port 60 when the temperature of the fluid passing through the chamber 57 is at or above a predetermined minimum optimum temperature.

The valve head 78 carries a projection 81 that has a spring seat 82 on the forward end thereof engaging a compression spring 83 located within the spring cage 84 that is mounted on the body 56 of the valve 55. The spring 83 regulates the temperature at which the valve 78 will close upon its seat 79 and thereby close the port 60.

The valve 55 has the outlet line 58 thereof connected with a fluid circulating line 96 through which fluid under pressure is delivered to a heat exchanger 85 that is located in the bottom portion of the engine radiator 17, as illustrated in Fig. 4. The outlet line 86 of heat exchanger 85 is connected by means of a fluid circulating line 87 with the inlet port 42 of the front wheel brake 12.

The fluid circulated through the front wheel brake 12 is exhausted through the port 43 into the fluid circulating line 88 that in turn is connected through the line 89 with the inlet side of a second heat exchanger 90 also located in the bottom portion of the engine radiator 17 and adjacent the heat exchanger 85 in the manner illustrated in Figure 4. The discharge line 91 of the heat exchanger 90 connects with a fluid circulating line 92 that is connected with the fluid reservoir 66. The fluid reservoir 66 is connected by means of a fluid circulating line 93 with the inlet line 62 of the valve 55 that delivers fluid into the chamber 61 of the valve 55.

When the cooling fluid in the circulating system heretofore described is cooled, that is at a temperature, for example, below about 180° F., the thermally responsive device 70 of the valve 55 withdraws the valve head 78 from its seat to open the port 60. With the port 60 open, fluid circulated by the pump 40 in the rear wheel 13 will be caused to be delivered into the chamber 57 from the line 50 and then, because of the open port 60, the fluid will be exhausted from the chamber 61 into the pump inlet line 63 for delivery back into the inlet port 41 of the pump 40. Since the resistance to flow through the by-pass port 60 is less than the line resistance in the circulating system including the front wheel brakes and the heat exchangers 85 and 90, the heat exchangers and the front wheel brakes will be substantially by-passed, by active circulation of cooling fluid by the pumps 40, the circulating lines 50 and 64, the chamber 57 of valve 55, port 60 and chamber 61 forming a substantially closed circulating system that by-passes the heat exchangers 85 and 90 and the front wheel brakes 12.

Thus, whenever the cooling fluid in the circulating system is below a predetermined optimum temperature, the valve 55 will be open so that there will be circulation of cooling fluid only through the rear brake disk assembly 21 with the result that no cooling of the fluid will take place since the heat exchangers are by-passed. This will result in a rapid heating of the cooling fluid as a result of friction flow through the lines and heat of friction in the rear wheel brakes to bring the temperature of the cooling fluid to a predetermined minimum optimum temperature and thereby reduce the drag loss resulting from circulation of cooled fluid having a relatively high viscosity.

Such conditions are particularly aggravated when the vehicle is operated in frigid weather conditions, such as 0° F. and below. When operating under these low temperature conditions, if the cooling fluid were allowed to circulate through the heat exchangers 85 and 90, the temperature of the cooling fluid would remain low for a substantial period of time with the result that the pumps would be circulating a fluid of relative high viscosity causing horsepower absorption from the engine that produces an economy loss in the engine operation.

On the other hand, if the cooling fluid is not circulated through the heat exchangers 85 and 90 during a period when the temperatures are abnormally low, the cooling fluid circulating in the by-pass circuit heretofore mentioned will warm rapidly to reduce its viscosity and substantially eliminate the horsepower loss resulting from a pumping of a high viscosity fluid.

In the fluid circulating system heretofore described, the heat of friction absorbed by the cooling fluid by its circulation through the rear wheel brakes 13 is removed by its flow through the heat exchanger 85 before delivery of the cooling fluid to the front wheel brakes 12 whereby to insure maximum cooling of the cooling fluid before delivery to the front wheel brakes. To remove the heat of friction absorbed by the cooling fluid in the front wheel brakes, the cooling fluid is delivered through the heat exchanger 90 before returning it to the reservoir 66 for resupply to the rear wheel brakes. In this manner there is provided a positive cooling of the cooling fluid just before delivery into either of the front or rear wheel brake systems to insure the cooling fluid being as near the minimum optimum operating temperature desired, which temperature is just slightly above the temperature at which the valve 55 closes the port 60 to cut off the by-pass circuit heretofore described and effect a forced circulation of fluid through the rear and front wheel brakes and the respective heat exchangers sequentially.

The front and rear wheel brakes are operated by a hydraulic actuating system that includes a master cylinder 100 having a displacement piston 101 therein for delivering fluid under pressure into the supply line 102. A check valve 103 of conventional type is provided in the master cylinder 100 to retain a residual pressure in the supply line 102 whenever the brakes are in a released condition. The supply line 102 connects with a junction block 103 that in turn has the supply lines 104, 105 and 106 extending therefrom to supply the wheel cylinders 25 and 36 of the rear and front brakes 13 and 12 respectively.

The master cylinder 100 is provided with a fluid reservoir 110 from which make-up fluid is supplied to the master cylinder 100 for any loss of fluid occurring in the hydraulic actuating brake system. The reservoir 110 is connected by means of a pipe line 112 with the reservoir 66 of the cooling fluid circulating system so that the reservoir 66 will in turn supply fluid to the master cylinder so long as any fluid is present in the cooling fluid circulating system.

In Figure 1 of the drawing, the reservoir 66 is illustrated as being alongside the master cylinder 100 and its reservoir 110, but in actual practice the reservoir 66 will be positioned at a higher level than the reservoir 110 of the master cylinder 100 so that fluid from the reservoir 66 will drain by gravity into the reservoir 110 for supply of fluid thereto so long as any fluid enters the reservoir 66. This arrangement insures a supply of hydraulic fluid to the hydraulic actuating system for the brakes so long as there is any fluid existing in the fluid cooling circulating system. Thus the operator of the vehicle will be in a position to actuate the brakes irrespective of whether or not they are being cooled, and under emergency conditions will therefore be able to bring the vehicle to a stop.

While the form of embodiment of the invention herein disclosed constitutes a perferred form, it is to be understood that other forms might be adopted as may come within the scope of the claims which follow.

What is claimed is as follows:

1. Brake mechanism for a vehicle, comprising in combination, front and rear vehicle wheels, brake means for the respective wheels, pump means for circulating cooling fluid through said brake means, a fluid circulating line system connecting said pump means and brake means for circulation of fluid through the brake means, a first heat exchange means in said system receiving heated fluid from some of said brake means and connected with other of said brake means for delivery of cooled fluid thereto, a second heat exchange means in said system receiving heated fluid from said other of said brake means and connected with said some of said brake means for delivery of cooled fluid thereto, and means in the said line system responsive to the temperature of the cooling fluid to effect by-passing of the heat exchange means by the circulating cooling fluid in circulation in the fluid circulating lines so long as the temperature of the cooling fluid is below a predetermined value.

2. Brake mechanism for a vehicle, comprising in combination, front and rear vehicle wheels, brake means for the respective wheels, pump means for circulating cooling fluid through said brake means, a fluid circulating line system connecting said pump means and brake means for circulation of fluid through the brake means, a first heat exchange means in said system receiving heated fluid from some of said brake means and connected with other of said brake means for delivery of cooled fluid thereto, a second heat exchange means in said system receiving heated fluid from said other of said brake means and connected with said some of said brake means for delivery of cooled fluid thereto, and means in the fluid circulating lines responsive to the temperature of the cooling fluid to effect circulation of the cooling fluid between the inlet and outlet of the pump means as a circulating circuit whereby to by-pass the heat exchange means whenever the temperature of the cooling fluid is below a predetermined value.

3. Brake mechanism in accordance with claim 2 in which the said pump means is in at least one of the wheels of the vehicle.

4. Brake mechanism for a vehicle, comprising in combination, front and rear vehicle wheels, brake means for the respective wheels, pump means in at least one of said wheels for circulating cooling fluid through all of the brake means of both the front and rear wheels, a fluid circulating line system connecting said pump means and the respective brake means for circulation of fluid through the brake means, a first heat exchange means in said line system receiving heated fluid from some of said brake means for delivery of cooled fluid thereto, a second heat exchange means in said line system receive heated fluid from said other of said brake means and connected with said some of said brake means for delivery of cooled fluid thereto, and means in the said line system responsive to the temperature of the cooling fluid circulating from the pump to effect circulation of the cooling fluid between the inlet and outlet of the pump means as a circulating circuit whereby to by-pass the heat exchange means so long as the temperature of the cooling fluid from the pump is below a predetermined value.

5. Brake mechanism for a vehicle in accordance with claim 4 that includes in the combination a radiator for cooling the engine of the vehicle with both of said heat exchange means being disposed in the lower portion of the radiator for maximum cooling effect so long as any water is present in the radiator system.

6. Brake mechanism for a vehicle, comprising in combination, front and rear vehicle wheels, brake means for the respective wheels, pump means in two of said wheels of the vehicle driven by the wheels in which the pump means are located for circulating cooling fluid through all of the brake means of the respective wheels, a fluid circulating line system connecting said pump means with all of the respective brake means for circulation of fluid through the brake means, a first heat exchange means in said line system receiving heated fluid from either the front or rear brake means and connected with the remaining of said brake means for delivery of cooled fluid thereto, a second heat exchange means in said line system receiving heated fluid from the said remaining of said brake means and connected with the said respective front or rear brake means for delivery of cooled fluid thereto, and means in the said line system responsive to the temperature of the cooling fluid delivered from the pump means to effect circulation of the cooling fluid between the inlet and outlet of the pump means as a circulating circuit whereby to by-pass the said heat exchange means whenever the temperature of the cooling fluid delivered from the pump means is below a predetermined value.

7. Brake mechanism in accordance with claim 6 in which the said means responsive to temperature of the cooling fluid is disposed between and closely adjacent the wheels containing the said pump means to provide for minimum circulating line length between the said temperature responsive means and the said pump means with maximum line length between the said temperature responsive means and the heat exchange means whereby to substantially prevent circulation through the heat exchange means by the differential of line resistance between the said temperature responsive means and the pump means relative to that between the temperature responsive means and the heat exchange means.

References Cited in the file of this patent
UNITED STATES PATENTS

| | | |
|---|---|---|
| 2,008,164 | Wolf | July 16, 1935 |
| 2,127,557 | Ells | Aug. 23, 1938 |
| 2,195,130 | Hoyt | Mar. 26, 1940 |
| 2,406,304 | Levy | Aug. 20, 1946 |
| 2,471,858 | Bloomfield | May 31, 1949 |
| 2,518,016 | Johnson et al. | Aug. 8, 1950 |
| 2,541,227 | Findley | Feb. 13, 1951 |
| 2,788,870 | Heck | Apr. 16, 1957 |

FOREIGN PATENTS

| | | |
|---|---|---|
| 739,244 | Great Britain | Oct. 26, 1955 |